United States Patent
Luo et al.

(10) Patent No.: US 12,401,625 B2
(45) Date of Patent: Aug. 26, 2025

(54) CROSS CLUSTER CONNECTIVITY

(71) Applicant: VMware, Inc., Palo Alto, CA (US)

(72) Inventors: Lan Luo, Beijing (CN); Jianjun Shen, Redwood City, CA (US); Jiajing Hu, Beijing (CN); Wenfeng Liu, Beijing (CN); Donghai Han, Beijing (CN)

(73) Assignee: VMware LLC, Palo Alto, CA (US)

( * ) Notice: Subject to any disclaimer, the term of this patent is extended or adjusted under 35 U.S.C. 154(b) by 361 days.

(21) Appl. No.: 18/178,832

(22) Filed: Mar. 6, 2023

(65) Prior Publication Data
US 2024/0244037 A1    Jul. 18, 2024

(30) Foreign Application Priority Data

Jan. 16, 2023    (WO) ................ PCT/CN2023/072329

(51) Int. Cl.
*H04L 9/40* (2022.01)
*G06F 9/455* (2018.01)

(52) U.S. Cl.
CPC ........ *H04L 63/029* (2013.01); *G06F 9/45558* (2013.01); *G06F 2009/45595* (2013.01)

(58) Field of Classification Search
CPC ............... H04L 63/029; G06F 9/45558; G06F 2009/45595
See application file for complete search history.

(56) References Cited

U.S. PATENT DOCUMENTS

| | | | |
|---|---|---|---|
| 2017/0171055 A1* | 6/2017 | Wang | H04L 41/12 |
| 2020/0344084 A1* | 10/2020 | Shribman | H04L 67/2885 |
| 2023/0123781 A1* | 4/2023 | Kaimal | H04L 41/0893 |
| | | | 726/12 |

* cited by examiner

*Primary Examiner* — Frantz B Jean
(74) *Attorney, Agent, or Firm* — King Intellectual Asset Management

(57) ABSTRACT

Systems and methods for exchanging network information between member clusters include configuring a gateway pool of a member cluster, the gateway pool comprising a plurality of gateway nodes, the member cluster comprising the plurality of gateway nodes and one or more nodes, configuring a gateway node of the plurality of gateway nodes as an active gateway node for the member cluster, writing member cluster information to a storage, the member cluster information indicating address information of the gateway node, reading second member cluster information from the storage, the second member cluster information indicating address information of a gateway node of a second member cluster, establishing a tunnel between the gateway node and the second gateway node based on the second member cluster information, and communicating network traffic from at least one node of the member cluster to at least one node of the second member cluster via the tunnel.

20 Claims, 5 Drawing Sheets

CROSS CLUSTER CONNECTIVITY

CROSS-REFERENCE TO RELATED PARAGRAPHS

The present application claims priority to International Patent Application No. PCT/CN2023/072329, filed Jan. 16, 2023, and entitled "Cross Cluster Connectivity," the entirety of which is incorporated by reference herein.

BACKGROUND

Software defined networking (SDN) involves a plurality of hosts in communication over a physical network infrastructure of a data center (e.g., an on-premise data center or a cloud data center). The physical network to which the plurality of physical hosts are connected may be referred to as an underlay network. Each host has one or more virtualized endpoints such as virtual machines (VMs), containers, Docker containers, data compute nodes, isolated user space instances, namespace containers, and/or other virtual computing instances (VCIs), that are connected to, and may communicate over, logical overlay networks. For example, the VMs and/or containers running on the hosts may communicate with each other using an overlay network established by hosts using a tunneling protocol.

A container is a package that relies on virtual isolation to deploy and run applications that access a shared operating system (OS) kernel. Containerized applications, also referred to as containerized workloads, can include a collection of one or more related applications packaged into one or more groups of containers, referred to as pods.

Containerized workloads may run in conjunction with a container orchestration platform that enables the automation of much of the operational effort required to run containers having workloads and services. This operational effort includes a wide range of things needed to manage a container's lifecycle, including, but not limited to, provisioning, deployment, scaling (up and down), networking, and load balancing. Kubernetes® (K8S)® software is an example open-source container orchestration platform that automates the operation of such containerized workloads. A container orchestration platform may manage one or more clusters, such as a K8S cluster, including a set of nodes that run containerized applications.

As part of an SDN, any arbitrary set of VCIs in a datacenter may be placed in communication across a logical Layer 2 (L2) overlay network by connecting them to a logical switch. A logical switch is an abstraction of a physical switch that is collectively implemented by a set of virtual switches on each node (e.g., host machine or VM) that has a VCI connected to the logical switch. The virtual switch on each node operates as a managed edge switch implemented in software by a hypervisor or operating system (OS) on each node. Virtual switches provide packet forwarding and networking capabilities to VCIs running on the node. In particular, each virtual switch uses hardware based switching techniques to connect and transmit data between VCIs on a same node, or different nodes.

Further, in some cases, multiple applications packaged into one or more groups of containers may be deployed on a single VM or a physical machine. The single VM or physical machine running a pod may be referred to as a node running the pod. In particular, a container is a package that relies on virtual isolation to deploy and run applications that access a shared operating system (OS) kernel. From a network standpoint, containers within a pod share a same network namespace, meaning they share the same internet protocol (IP) address or IP addresses associated with the pod.

A network plugin, such as a container networking interface (CNI) plugin, may be used to create virtual network interface(s) usable by the pods for communicating on respective logical networks of the SDN infrastructure in a data center. In particular, the network plugin may be a runtime executable that configures a network interface, referred to as a pod interface, into a container network namespace. The network plugin is further configured to assign a network address (e.g., an IP address) to each created network interface (e.g., for each pod) and may also add routes relevant for the interface. Pods can communicate with each other using their respective IP addresses. For example, packets sent from a source pod to a destination pod may include a source IP address of the source pod and a destination IP address of the destination pod, so that the packets are appropriately routed over a network from the source pod to the destination pod.

Communication between pods of a node may be accomplished via use of virtual switches implemented in nodes. Each virtual switch may include one or more virtual ports (Vports) that provide logical connection points between pods. For example, a pod interface of a first pod and a pod interface of a second pod may connect to Vport(s) provided by the virtual switch(es) of their respective nodes to allow for communication between the first and second pods. In this context "connect to" refers to the capability of conveying network traffic, such as individual network packets, or packet descriptors, pointers, identifiers, etc., between components so as to effectuate a virtual data path between software components.

Within a single cluster, the container orchestration platform supports network plugins for cluster networking, with such network plugins mainly focusing on pods and services within the single cluster. A service is an abstraction to expose an application running on a set of pods as a network service. While a client may make a request of the service, the request may be load balanced to different instances of the application (i.e., different pods). However, many Cloud providers operate multiple clusters in multiple regions or availability zones and run replicas of the same applications in several clusters. Thus, a more efficient and streamlined approach for cross-cluster network connections is desirable to allow applications to communicate with each other across clusters, beyond the communication occurring in a single cluster, such that pods and services are accessible across clusters.

SUMMARY

One or more embodiments of a method for exchanging network information between member clusters generally includes configuring a first gateway pool of a first member cluster, the first gateway pool comprising a first plurality of gateway nodes, the first member cluster comprising the first plurality of gateway nodes and one or more first nodes, and configuring a first gateway node of the first plurality of gateway nodes as an active gateway node for the first member cluster. The method further generally includes writing first member cluster information to a storage, the first member cluster information indicating address information of the first gateway node, reading second member cluster information from the storage, the second member cluster information indicating address information of a gateway node of a second member cluster, establishing a tunnel between the first gateway node and the second gateway node based on the second member cluster information, and communicating network traffic from at least one node of the first member cluster to at least one node of the second member cluster via the tunnel.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
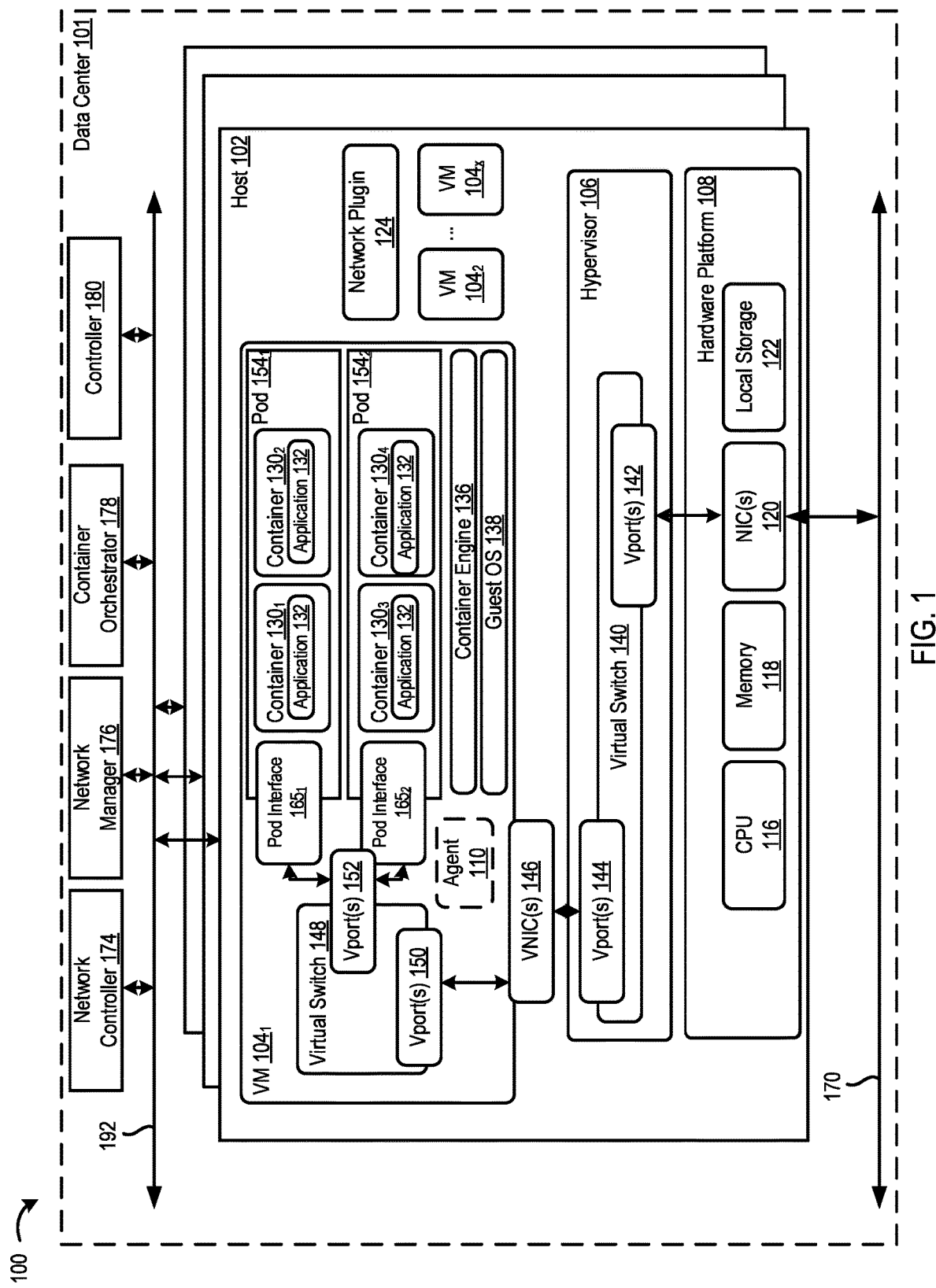
FIG. 1 illustrates a computing system in which embodiments described herein may be implemented.

Certain embodiments herein provide techniques for cross-cluster network connectivity to allow applications to communicate with each other across clusters, beyond the communication occurring in a single cluster, such that pods and services are accessible across clusters. In certain embodiments, a controller of each cluster may select one or more nodes (e.g., a plurality of nodes) as a gateway pool for the cluster. Accordingly, each cluster may have a respective gateway pool comprising one or more nodes. Further, at least one node (e.g., one node) of each gateway pool may be selected at a given time to be an active gateway for other nodes within the cluster, including nodes within the gateway pool and other nodes within the cluster, if any. Each of the active gateways in each cluster forms a tunnel with each other active gateway of each other cluster. The tunnels may be formed using any suitable tunneling protocol, such as GENEVE, VXLAN, GRE, STT, L2TP, etc. Accordingly, the gateways of each cluster are able to communicate with one another over the formed tunnels. Each node within each cluster is further configured to route traffic for a destination to another cluster, referred to as cross cluster traffic, via the active gateway of the cluster. The active gateway of source node then tunnels the traffic to the active gateway of the destination node, and the active gateway of the destination node routes the traffic to the destination node. Via such network tunnel connections between the gateways of the clusters, pods or services can communicate with each other within a group of clusters. Each cluster of such group of clusters is referred to as a member cluster.

A member cluster as described herein is representative of an individual cluster in a group of clusters. A centralized storage may be used to collect and exchange network information between the member clusters as will be described herein to thereafter allow for the network tunnels to be built between gateways of the member clusters. Each member cluster has access to write to and read from the centralized storage. With such cross-cluster network connections and communication, the nodes of clusters may communicate across clusters and provide a native manner of allowing an application of a cluster to communicate with pods or services of another cluster via the network tunnels and without direct network access between all nodes in a group of clusters. The techniques described herein further provide an automated manner to detect any gateway failure to replace a failed gateway with another node in the gateway pool and aid with continued connectivity with minimal failure or downtime such that global connectivity occurs with a high availability.

Embodiments of the systems and methods described herein employ such techniques for exchanging network information between member clusters 303A, 303B (FIG. 3) and include configuring a select plurality of nodes A1, A2, B1, B2 in first and second member clusters 303A, 303B as gateway nodes, using respective controllers 308A, 308B to collect respective cluster information, and verifying the health of each gateway 304A, 304B of each member cluster 303A, 303B. A first gateway node A1 of the first member cluster and a second gateway node B1 of the second member cluster respectively are configured as first and second active gateway nodes upon the health verification, and the first and second controllers 308A, 308B are used to exchange the respective first and second sets of member cluster information. Health of the first and second active gateway nodes is verified. Upon a failure to verify health of either of the active gateway nodes A1, B1, another gateway node A2 and/or B2, respectively, is designated as the respective first or second active gateway node.

FIG. 1 depicts example physical and virtual network components in a networking environment 100 in which embodiments of the present disclosure may be implemented.

Networking environment 100 includes a data center 101. Data center 101 includes one or more hosts 102, a management network 192, a data network 170, a network controller 174, a network manager 176, a container orchestrator 178, and a cross-cluster connectivity controller 180. Data network 170 and management network 192 may be implemented as separate physical networks or as separate virtual local area networks (VLANs) on the same physical network.

Host(s) 102 may be communicatively connected to data network 170 and management network 192. Data network 170 and management network 192 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be configured to provide a virtualization layer, also referred to as a hypervisor 106, that abstracts processor, memory, storage, and networking resources of a hardware platform into multiple VMs $104_1$-$104_x$ (collectively referred to herein as "VMs 104" and individually referred to herein as "VM 104").

Host(s) 102 may be constructed on a server grade hardware platform 108, such as an x86 architecture platform. Hardware platform 108 of a host 102 may include components of a computing device such as one or more processors (CPUs) 116, system memory 118, one or more network interfaces (e.g., physical network interface cards (PNICs) 120), storage 122, and other components (not shown). A CPU 116 is configured to execute instructions, for example, executable instructions that perform one or more operations described herein and that may be stored in the memory and storage system. The network interface(s) enable host 102 to communicate with other devices via a physical network, such as management network 192 and data network 170.

In certain aspects, hypervisor 106 implements one or more logical switches as a virtual switch 140. Any arbitrary set of VMs in a datacenter may be placed in communication across a logical Layer 2 (L2) overlay network by connecting them to a logical switch. A logical switch is an abstraction of a physical switch that is collectively implemented by a set of virtual switches on each host that has a VM connected to the logical switch. The virtual switch on each host operates as a managed edge switch implemented in software by a hypervisor on each host. Virtual switches provide packet forwarding and networking capabilities to VMs running on the host. In particular, each virtual switch uses hardware based switching techniques to connect and transmit data between VMs on a same host, or different hosts.

Virtual switch 140 may be a virtual switch attached to a default port group defined by a network manager that provides network connectivity to a host 102 and VMs 104 on the host 102. Port groups include subsets of virtual ports ("Vports") of a virtual switch, each port group having a set of logical rules according to a policy configured for the port group. Each port group may comprise a set of Vports associated with one or more virtual switches on one or more hosts 102. Ports associated with a port group may be attached to a common VLAN according to the IEEE 802.1Q specification to isolate the broadcast domain.

A virtual switch 140 may be a virtual distributed switch (VDS). In this case, each host 102 may implement a separate virtual switch corresponding to the VDS, but the virtual switches 140 at each host 102 may be managed like a single virtual distributed switch (not shown) across the hosts 102.

Each of VMs 104 running on host 102 may include virtual interfaces, often referred to as virtual network interface cards (VNICs), such as VNICs 146, which are responsible for exchanging packets between VMs 104 and hypervisor 106. VNICs 146 can connect to Vports 144, provided by virtual switch 140. Virtual switch 140 also has Vport(s) 142 connected to PNIC(s) 120, such as to allow VMs 104 to communicate with virtual or physical computing devices outside of host 102 via data network 170 and/or management network 192.

Each VM 104 may also implement a virtual switch 148 for forwarding ingress packets to various entities running within the VM 104. Such virtual switch 148 may run on a guest OS 138 of the VM 104, instead of being implemented by a hypervisor, and may be programmed, for example, by agent 110 running on guest OS 138 of the VM 104. For example, the various entities running within each VM 104 may include pods 154 including containers 130. Depending on the embodiment, the virtual switch 148 may be configured with Open vSwitch (OVS), which is an open source project to implement virtual switches to enable network automation, while still supporting standard management interfaces and protocols.

In particular, each VM 104 implements a virtual hardware platform that supports the installation of a guest OS 138, which is capable of executing one or more applications. Guest OS 138 may be a standard, commodity operating system. Examples of a guest OS include Microsoft Windows, Linux, and/or the like.

Each VM 104 may include a container engine 136 installed therein and running as a guest application under control of guest OS 138. Container engine 136 is a process that enables the deployment and management of virtual instances (referred to interchangeably herein as "containers") by providing a layer of OS-level virtualization on guest OS 138 within VM 104, or an OS of host 102. Containers 130 are software instances that enable virtualization at the OS level. That is, with containerization, the kernel of guest OS 138, or an OS of host 102 if the containers are directly deployed on the OS of host 102, is configured to provide multiple isolated user space instances, referred to as containers. Containers 130 appear as unique servers from the standpoint of an end user that communicates with each of containers 130. However, from the standpoint of the OS on which the containers execute, the containers are user processes that are scheduled and dispatched by the OS.

Containers 130 encapsulate an application, such as application 132 as a single executable package of software that bundles application code together with all of the related configuration files, libraries, and dependencies required for it to run. Application 132 may be any software program, such as a word processing program or a gaming server.

A user can deploy containers 130 through container orchestrator 178. Container orchestrator 178 implements an orchestration control plane, such as Kubernetes®, to deploy and manage applications and/or services thereof on hosts 102, of a host cluster, using containers 130. For example, container orchestrator 178 may deploy containerized applications as containers 130 and a control plane (e.g., including controller 180 and agent 110) on a cluster of hosts. The control plane, for each cluster of hosts, manages the computation, storage, and memory resources to run containers 130. Further, the control plane may support the deployment and management of applications (or services) on the cluster using containers 130. In some cases, the control plane deploys applications as pods 154 of containers 130 running on hosts 102, either within VMs or directly on an OS of the host. Other types of container-based clusters based on container technology, such as Docker® clusters, may also be considered. Though certain aspects are discussed with pods 154 running in a VM as a node, and container engine 136, agent 110, and virtual switch 148 running on guest OS 138 of VM 104, the techniques discussed herein are also applicable to pods 154 running directly on an OS of host 102 as a node. For example, host 102 may not include hypervisor 106, and may instead include a standard operating system. Further, agent 110 and container engine 136 may then run on the OS of host 102.

In order for packets to be forwarded to and received by pods 154 and their containers 130 running in a first VM $104_1$, each of the pods 154 may be set-up with a network interface, such as a pod interface 165. The pod interface 165 is associated with an IP address, such that the pod 154, and each container 130 within the pod 154, is addressable by the IP address. Accordingly, after each pod 154 is created, network plugin 124 is configured to set up networking for the newly created pod 154 enabling the new containers 130 of the pod 154 to send and receive traffic. As shown, pod interface 1651 is configured for and attached to a pod 1541. Other pod interfaces, such as pod interface 1652, may be configured for and attached to different, existing pods 154.

The network plugin 124 may include a set of modules that execute on each node to provide networking and security functionality for the pods. In addition, an agent 110 may execute on each VM 104 (i) to configure the forwarding element and (ii) to handle troubleshooting requests. In addition, controller 180 may provide configuration data (e.g., forwarding information, network policy to be enforced) to the agents 110, which use this configuration data to configure the forwarding elements (e.g., virtual switches) on their respective VMs 104, also referred to as nodes 104. Agent 110 may further be configured to forward node 104 and/or cluster 103 (FIG. 2) information as described herein. The cluster 103 is also described as a member cluster 303 (FIG. 3) herein. Distributed services (e.g., for aggregating troubleshooting information from multiple nodes) may also execute within the cluster 103.

Additional details of the network plugin 124 and associated functionality is disclosed in U.S. application Ser. No. 17/006,846, filed on Aug. 30, 2022, and titled "CONNECTION TRACKING FOR CONTAINER CLUSTER," which is hereby incorporated by reference herein in its entirety.

Data center 101 includes a network management plane and a network control plane. The management plane and control plane each may be implemented as single entities (e.g., applications running on a physical or virtual compute instance), or as distributed or clustered applications or components. In alternative aspects, a combined manager/controller application, server cluster, or distributed application, may implement both management and control functions. In the embodiment shown, network manager 176 at least in part implements the network management plane and network controller 174 and controller 180 in part implement the network control plane.

The network control plane is a component of software defined network (SDN) infrastructure and determines the logical overlay network topology and maintains information about network entities such as logical switches, logical routers, endpoints, etc. The logical topology information is translated by the control plane into physical network configuration data that is then communicated to network elements of host(s) 102. Network controller 174 generally represents a network control plane that implements software defined networks, e.g., logical overlay networks, within data center 101. Network controller 174 may be one of multiple network controllers executing on various hosts in the data center that together implement the functions of the network control plane in a distributed manner. Network controller 174 may be a computer program that resides and executes in a server in the data center 101, external to data center 101 (e.g., such as in a public cloud) or, alternatively, network controller 174 may run as a virtual appliance (e.g., a VM) in one of hosts 102. Network controller 174 collects and distributes information about the network from and to endpoints in the network. Network controller 174 may communicate with hosts 102 via management network 192, such as through control plane protocols. In certain aspects, network controller 174 implements a central control plane (CCP) which interacts and cooperates with local control plane components, e.g., agents, running on hosts 102 in conjunction with hypervisors 106.

Network manager 176 is a computer program that executes in a server in networking environment 100, or alternatively, network manager 176 may run in a VM 104, e.g., in one of hosts 102. Network manager 176 communicates with host(s) 102 via management network 192. Network manager 176 may receive network configuration input from a user, such as an administrator, or an automated orchestration platform (not shown) and generate desired state data that specifies logical overlay network configurations. For example, a logical network configuration may define connections between VCIs and logical ports of logical switches. Network manager 176 is configured to receive inputs from an administrator or other entity, e.g., via a web interface or application programming interface (API), and carry out administrative tasks for data center 101, including centralized network management and providing an aggregated system view for a user.

Figure 2:
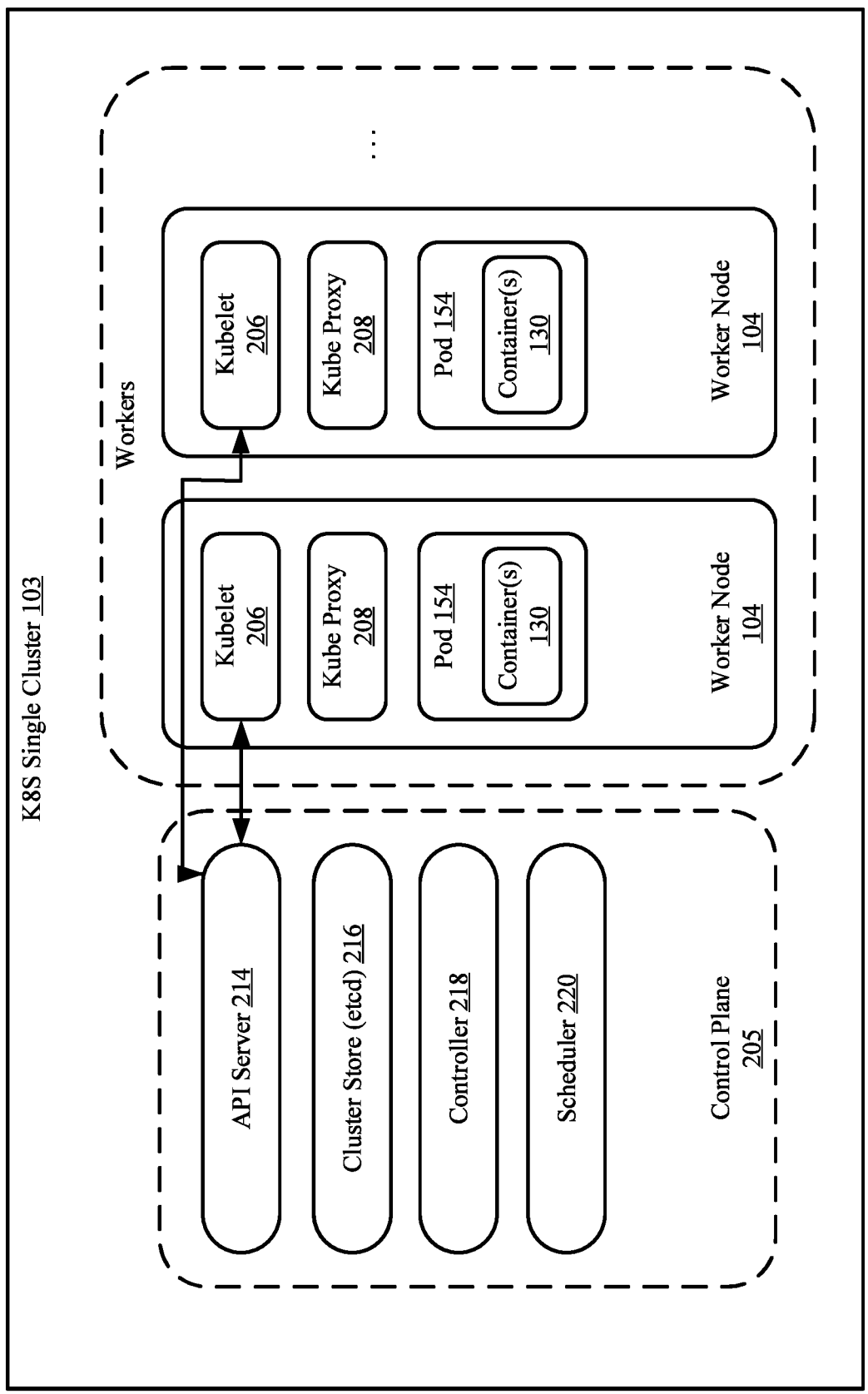
FIG. 2 is a block diagram of an exemplary container-based cluster for the computing system of FIG. 1, according to an example embodiment of the present disclosure.

An example container-based cluster for running containerized workloads is illustrated in FIG. 2. It should be noted that the block diagram of FIG. 2 is a logical representation of a container-based cluster, and does not show where the various components are implemented and run on physical systems. While the example container-based cluster shown in FIG. 2 is a Kubernetes (K8S) cluster 103, in other examples, the container-based cluster may be another type of container-based cluster based on container technology, such as Docker® clusters.

When Kubernetes is used to deploy applications, a cluster, such as K8S cluster 103 illustrated in FIG. 1, is formed from a combination of worker nodes 104 and a control plane 205 (e.g., container orchestrator 178 of FIG. 1). Though worker nodes 104 are shown as VMs 104 of FIG. 1, as discussed, they instead may be physical machines. In certain aspects, components of control plane 205 run on VMs or physical machines. Worker nodes 104 are managed by control plane 205, which manages the computation, storage, and memory resources to run all worker nodes 104. Though pods 154 of containers 130 are shown running on the cluster 103, the pods may not be considered part of the cluster infrastructure, but rather as containerized workloads running on the cluster 103.

Each worker node 104, or worker compute machine, includes a kubelet 206, which is an agent that ensures that one or more pods 154 run in the worker node 104 according to a defined specification for the pods, such as defined in a workload definition manifest. Each pod 154 may include one or more containers 130. The worker nodes 104 can be used to execute various applications and software processes using container 130. Further each worker node 104 includes a kube proxy 208. Kube proxy 208 is a Kubernetes network proxy that maintains network rules on worker nodes 104. These network rules allow for network communication to pods 154 from network sessions inside and/or outside of K8S cluster 103.

Control plane 205 includes components such as an application programming interface (API) server 214, a cluster store (etcd) 216, a controller 218, and a scheduler 220. Control plane 205's components make global decisions about K8S cluster 103 (e.g., scheduling), as well as detect and respond to cluster events (e.g., starting up a new pod 154 when a workload deployment's replicas field is unsatisfied).

API server 214 operates as a gateway to K8S cluster 103. As such, a command line interface, web user interface, users, and/or services communicate with K8S cluster 103 through API server 114. One example of a Kubernetes API server 214 is kube-apiserver, which kube-apiserver is designed to scale horizontally—that is, this component scales by deploying more instances. Several instances of kube-apiserver may be run, and traffic may be balanced between those instances.

Cluster store (etcd) 216 is a data store, such as a consistent and highly-available key value store, used as a backing store for all K8S cluster 103 data.

Controller 218 is a control plane 205 component that runs and manages controller processes in K8S cluster 103. For example, control plane 205 may have (e.g., four) control loops called controller processes, which watch the state of cluster 103 and try to modify the current state of cluster 103 to match an intended state of cluster 103. In certain aspects, controller processes of controller 218 are configured to monitor external storage for changes to the state of cluster 103.

Scheduler 220 is a control plane 205 component configured to allocate new pods 154 to worker nodes 104. Additionally, scheduler 218 may be configured to distribute resources and/or workloads across worker nodes 105. Resources may refer to processor resources, memory resources, networking resources, and/or the like. Scheduler 218 may watch worker nodes 104 for how well each worker node 104 is handling their workload, and match available resources to the worker nodes 104. Scheduler 218 may then schedule newly created containers 130 to one or more of the worker nodes 104.

In other words, control plane 205 manages and controls every component of the cluster 103. Control plane 205 handles most, if not all, operations within cluster 103, and its components define and control cluster 103's configuration and state data. Control plane 205 configures and runs the deployment, management, and maintenance of the containerized applications.

Figure 3:
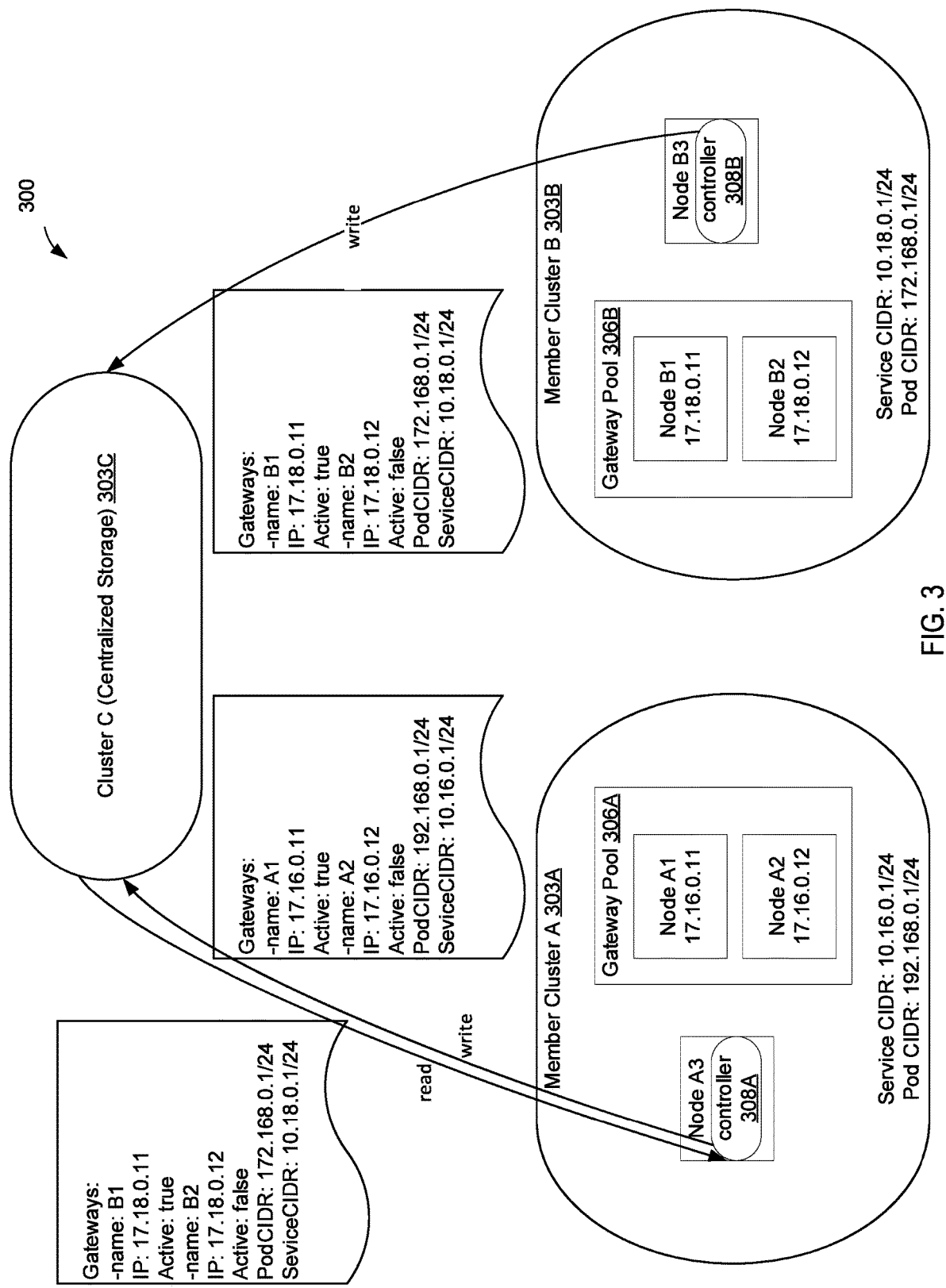
FIG. 3 illustrates an exemplary cluster platform to exchange network information between member clusters, according to an example embodiment of the present disclosure.

FIG. 3 depicts an exemplary cluster platform 300 to exchange network information between member clusters. The cluster platform 300 includes a centralized storage component 303C, which may be the cluster store 216 (e.g., etcd or any suitable network accessible data store) or a member cluster 303, such as Cluster C shown, which may be a dedicated storage cluster. Member cluster 303A (e.g., Member Cluster A) is configured to exchange information with Member cluster 303B (e.g., Member Cluster B) via the centralized storage component 303C as described herein and in greater detail below with respect to a method 500 of FIG. 5. Member cluster 303A includes one or more nodes 104, which are shown to include one or more gateway nodes A1, A2 of a gateway pool 306A and one or more other nodes such as node A3 that are non-gateway nodes. Member cluster 303B also includes one or more nodes 104, which are shown to include one or more gateway nodes B1, B2 of a gateway pool 306B and one or more other nodes such as node B3 that are non-gateway nodes. There may be fewer or additional gateway and/or non-gateway nodes in Member cluster 303A and/or 303B. A controller 308 (e.g., corresponding to controller 180 of FIG. 1) is disposed on a node of the one or more other nodes, such as node A3 of member cluster 303A and node B3 of node 303B. Member cluster 303A and member cluster 303B each include a respective Pod CIDR and Service CIDR. Each Pod CIDR comprises a respective Internet Protocol (IP) prefix for all pods in the respective member cluster 303A, 303B, and each Service CIDR comprises a respective IP prefix for all services in the respective member cluster 303A, 303B.

Figure 4:
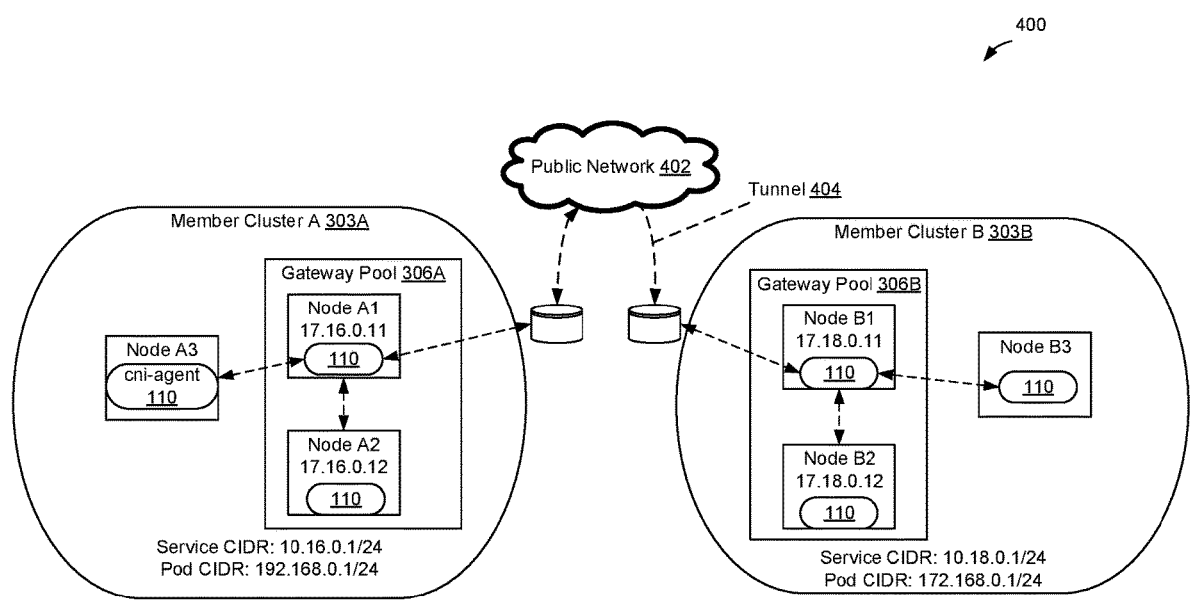
FIG. 4 illustrates an exemplary tunnel platform including a tunnel built between gateway nodes of the cluster platform of FIG. 3, according to an example embodiment of the present disclosure.

FIG. 4 depicts an exemplary tunnel platform 400 including a public network 402 and a network tunnel 404 built between gateway nodes A1, B1 of the cluster platform over the public network 402 such that members clusters 303A, 303B can exchange network information via the network tunnel 404. The network tunnel 404 is built after member clusters 303A, 303B have exchanged respective first and second sets of member cluster information as set forth in the method 500 of FIG. 5 in greater detail. In certain aspects, each of the first set of member cluster information and the second set of member cluster information comprises respective Pod CIDR, Service CIDR, and/or and gateway node information. The gateway node information may include a respective node IP address and name of each of the one or more gateway nodes of each respective gateway pool. The gateway node information may further indicate an active gateway of the one or more gateway nodes of the cluster.

Figure 5:
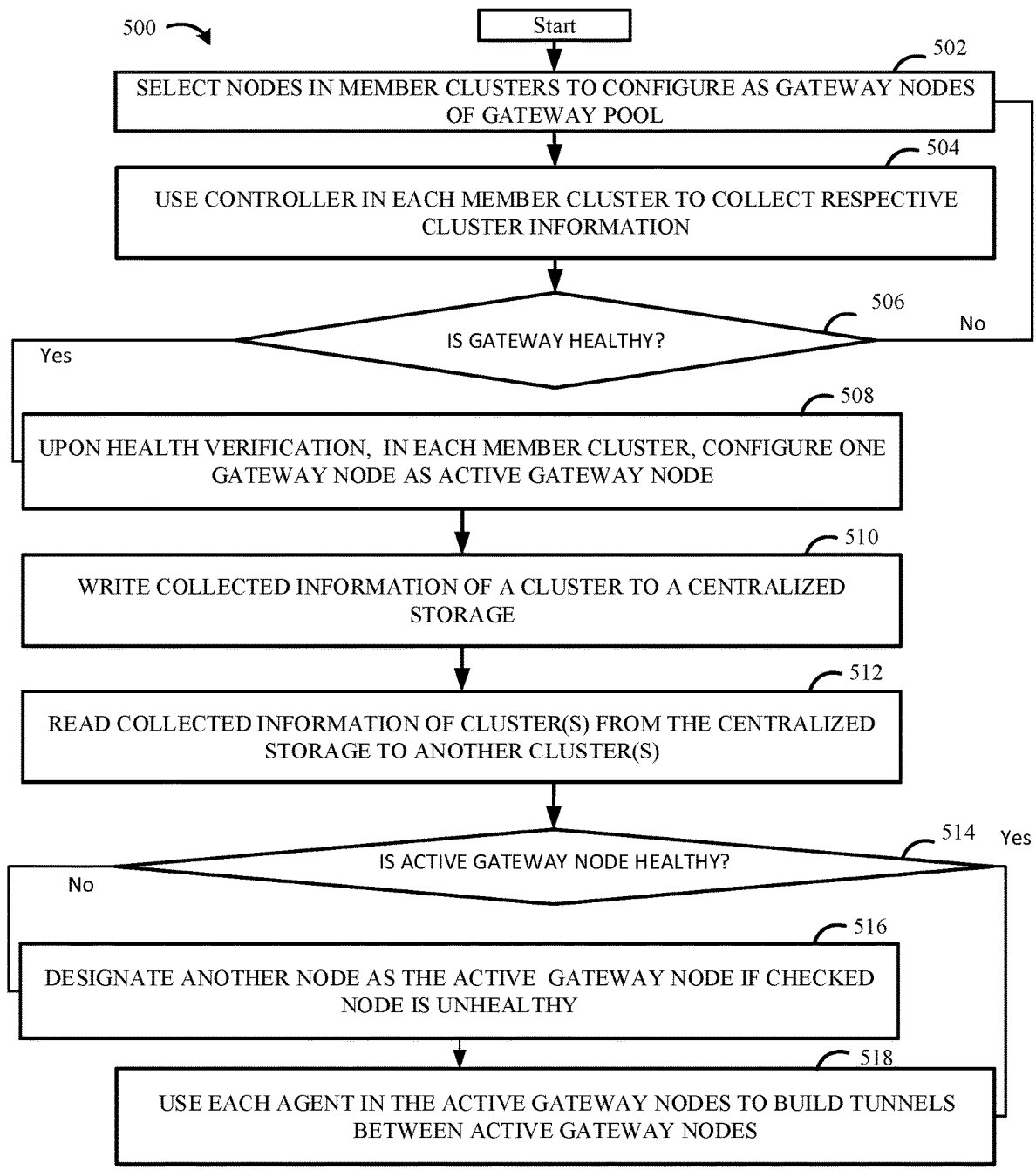
FIG. 5 illustrates a flow diagram depicting an example operation for exchanging network information between member clusters, according to an example embodiment of the present disclosure.

FIG. 5 depicts a method 500 for exchanging network information between member clusters 303A, 303B. In block 502, the method 500 includes selecting a plurality of nodes in a first member cluster 303A and a second member cluster 303B to configure (e.g., annotate), as one or more gateway nodes of gateway pools 306A and 306B, respectively (respectively, nodes A1-A2 and B1-B2), and configuring (e.g., annotating) the select plurality of nodes. In certain embodiments, an administrator selects a plurality of nodes of a member cluster as nodes of a gateway pool. The selected nodes may be annotated with a gateway annotation such as 'multiplecluster.k8s.io/gateway=true' for example in one or more manifests of the selected nodes.

In block 504, a first controller 308 of node A3 of the first member cluster 303A and a second controller 308 of node B3 of the second member cluster 303B is used to respectively collect a first set and a second set of member cluster information from the member clusters 303A, 303B. In embodiments, the controller of each member cluster will watch node resource events once one or more nodes are annotated with a gateway notation. The controller may be configured to collect notifications, Pod CIDR and Service CIDR in a respective member cluster, and all gateway node information such as node IP address as name.

In block 506, the health of each of the one or more gateway nodes A1, A2, B1, B2 of the gateway pools 306A and 306B of each of the first member cluster 303A and the second member cluster 303B is verified as part of a gateway health verification.

In block 508, upon said gateway health verification, a first gateway node A1 of the select plurality of nodes A1, A2 of the first member cluster 303A and a second gateway node B1 of the select plurality of nodes B1, B2 of the second member cluster 303B are configured respectively as a first active gateway node A1 and a second active gateway node B1. As a non-limiting embodiment, each active gateway node may be annotated as 'gateway.multicluster.k8s.io/active=true." The other gateway nodes would then be set as 'gateway.multicluster.k8s.io/active-false."

The first and second controllers 308A, 308B are used to exchange the respective first and second sets of member cluster information. In block 510, one of the first controller 308A and the second controller 308B may be used to write the respective first set or second set of member cluster information to a centralized storage component 303C as a written set of member cluster information. In block 512, the other of the first controller 308A and the second controller 308B may be used to read the written set of member cluster information from the centralized storage component 303C. Thus, when the controller of a respective cluster collects all basic network information for the respective cluster, the controller is configured to write the basic network information for the respective cluster to the centralized storage. The controller of another cluster is configured to watch (e.g., periodically poll) for any change in the centralized storage, such as receipt of the written information, get a notification when such a change occurs to then retrieve the other cluster's information via reading the written information from the centralized storage, or receive the cluster's information from the central storage, such as via a push by the central storage.

In block 514, the method 500 includes verifying the health of the first active gateway node A1 and the second active gateway node B1. In block 516, upon a failure to verify the health of the first active gateway node A1 or the second active gateway node B1, another gateway node of the one or more gateway nodes of gateway pools 306A, 306B of the respective first member cluster 303A or the second member cluster 303B is designated as the replacement first active gateway node A2 or the replacement second active gateway node B2. Upon a successful verification of the health of the first and second active gateway nodes A1 and B1 in block 514 or the replacement first and second active gateway node(s) A2 and/or B2 in block 516, the method advances to block 518. The controller in each member cluster may continuously (e.g., periodically) check on the health of the nodes in the gateway pool. For example, pings may be used to check health. In another example, the gateway nodes are configured to send heartbeat messages over the network to the controller, and if no heartbeat message is received for a threshold time period, the controller determines the gateway node has failed. If an active gateway node is down and unhealthy, the controller is configured to update the failed gateway node with a false annotation and pick another gateway node to annotate with a true annotation as the replacement active gateway node. In embodiments, the controller may update failed active gateway node with 'gateway.multicluster.k8s.io/active=false' (switching true to false) and then randomly pick a healthy gateway node to annotate with 'gateway.multicluster.k8s.io/active=true' (switching from false to true). The controller of the member cluster may then update the network information in the centralized storage to mark the new healthy gateway node as the active gateway node.

In block 518, when each of the first member cluster 303A and the second member cluster 303B has exchanged the respective first and second sets of member cluster information, agent 110 of each of the first active gateway node A1 (or A2 if replaced in block 516) and the second active gateway node (or B2 if replaced in block 516) is used to build a network tunnel 404 therebetween such that the first and second member clusters 303A, 303B are communicatively coupled and configured to exchange network information via the network tunnel 404. For example, the member cluster information indicates address information of each of the active gateway nodes, and identifies which nodes are active gateway nodes, such that such address information can be used by each active gateway node to establish a tunnel. In certain aspects, for each cluster, the agent 110 of the active gateway node, in conjunction with the controller 308, configures virtual switches and/or routers on the active gateway node to establish the tunnel, and route ingress traffic into the cluster to the local nodes in the cluster, and egress traffic to another cluster over the respective tunnel to the active gateway node of the other cluster. Further, in certain aspects, for each controller, the agents 110 of each node in the cluster, in conjunction with the controller 308, configure virtual switches and/or routers on each of the nodes in the member cluster to cause network traffic for a destination cluster outside the cluster to be routed to the active gateway node.

In embodiments, the agent 110 on each gateway of respective member clusters sets up the network tunnel 404 from a local gateway to a remote gateway and sets up routes to accept local non-gateway traffic and remote gateway cross-cluster traffic. Based on IP addresses in headers of the traffic, and forwarding/routing tables in virtual switches/routers configured by agent 110, virtual switches/routers on a general node (including non-gateway nodes, and inactive gateway nodes) of a member cluster may distinguish cross-cluster traffic and forward all cross-cluster traffic to the local active gateway node. In a situation where the active gateway node is changed to inactive and replaced, the agents 110 on the general nodes may configure virtual switches/routers to forward all cross-cluster traffic to the new active gateway node. Thus, the systems and methods herein describe techniques for cross-cluster network connectivity to allow applications to communicate with each other across member clusters, beyond the communication occurring in a single cluster, such that pods and services are accessible and communicatively coupled across the member clusters, allowing for an increase in global connectivity and high availability of information across clusters.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for exchanging network information between member clusters, the method comprising:
configuring a first gateway pool of a first member cluster, the first gateway pool comprising a first plurality of gateway nodes, the first member cluster comprising the first plurality of gateway nodes and one or more first nodes;
configuring a first gateway node of the first plurality of gateway nodes as an active gateway node for the first member cluster;
writing first member cluster information to a storage, the first member cluster information indicating address information of the first gateway node;
reading second member cluster information from the storage, the second member cluster information indicating address information of a gateway node of a second member cluster;
establishing a tunnel between the first gateway node and the second gateway node based on the second member cluster information; and
communicating network traffic from at least one node of the first member cluster to at least one node of the second member cluster via the tunnel.

2. The method of claim 1, further comprising:
in response to determining the first gateway node has failed, configuring a second gateway node of the first plurality of gateway nodes as the active gateway node for the first member cluster; and
in response to the configuring the second gateway node as the active gateway node, updating the first member cluster information at the storage to indicate address information of the second gateway node.

3. The method of claim 1, wherein the first member cluster information further comprises address information of each of the first plurality of gateway nodes, and an indication of the active gateway.

4. The method of claim 1, wherein each of the one or more first nodes is configured to run a pod of containers.

5. The method of claim 1, wherein the address information comprises at least one of a pod CIDR of the first member cluster, a service CIDR of the first member cluster, or an Internet Protocol (IP) address of the first gateway node.

6. The method of claim 1, wherein the storage comprises a third member cluster.

7. The method of claim 1, further comprising routing traffic within the first member cluster, that is from the first plurality of gateway nodes and one or more first nodes and to the second member cluster, to the first gateway node.

8. A non-transitory computer readable medium comprising instructions that, when executed by one or more processors of a computing system, cause the computing system to perform a method for exchanging network information between member clusters, the method comprising:
configuring a first gateway pool of a first member cluster, the first gateway pool comprising a first plurality of gateway nodes, the first member cluster comprising the first plurality of gateway nodes and one or more first nodes;

configuring a first gateway node of the first plurality of gateway nodes as an active gateway node for the first member cluster;

writing first member cluster information to a storage, the first member cluster information indicating address information of the first gateway node;

reading second member cluster information from the storage, the second member cluster information indicating address information of a gateway node of a second member cluster;

establishing a tunnel between the first gateway node and the second gateway node based on the second member cluster information; and communicating network traffic from at least one node of the first member cluster to at least one node of the second member cluster via the tunnel.

9. The non-transitory computer readable medium of claim 8, the method further comprising:

in response to determining the first gateway node has failed, configuring a second gateway node of the first plurality of gateway nodes as the active gateway node for the first member cluster; and in response to the configuring the second gateway node as the active gateway node, updating the first member cluster information at the storage to indicate address information of the second gateway node.

10. The non-transitory computer readable medium of claim 8, wherein the first member cluster information further comprises address information of each of the first plurality of gateway nodes, and an indication of the active gateway.

11. The non-transitory computer readable medium of claim 8, wherein each of the one or more first nodes is configured to run a pod of containers.

12. The non-transitory computer readable medium of claim 8, wherein the address information comprises at least one of a pod CIDR of the first member cluster, a service CIDR of the first member cluster, or an Internet Protocol (IP) address of the first gateway node.

13. The non-transitory computer readable medium of claim 8, wherein the storage comprises a third member cluster.

14. The non-transitory computer readable medium of claim 8, the method further comprising routing traffic within the first member cluster, that is from the first plurality of gateway nodes and one or more first nodes and to the second member cluster, to the first gateway node.

15. A computer system, the computer system comprising:
a memory; and
a processor communicatively coupled to the memory, the processor being configured to:

configure a first gateway pool of a first member cluster, the first gateway pool comprising a first plurality of gateway nodes, the first member cluster comprising the first plurality of gateway nodes and one or more first nodes;

configure a first gateway node of the first plurality of gateway nodes as an active gateway node for the first member cluster;

write first member cluster information to a storage, the first member cluster information indicating address information of the first gateway node;

read second member cluster information from the storage, the second member cluster information indicating address information of a gateway node of a second member cluster;

establish a tunnel between the first gateway node and the second gateway node based on the second member cluster information; and communicate network traffic from at least one node of the first member cluster to at least one node of the second member cluster via the tunnel.

16. The computer system of claim 15, the processor further configured to:

in response to determining the first gateway node has failed, configure a second gateway node of the first plurality of gateway nodes as the active gateway node for the first member cluster; and in response to the configuring the second gateway node as the active gateway node, update the first member cluster information at the storage to indicate address information of the second gateway node.

17. The computer system of claim 15, wherein the first member cluster information further comprises address information of each of the first plurality of gateway nodes, and an indication of the active gateway.

18. The computer system of claim 15, wherein each of the one or more first nodes is configured to run a pod of containers.

19. The computer system of claim 15, wherein the address information comprises at least one of a pod CIDR of the first member cluster, a service CIDR of the first member cluster, or an Internet Protocol (IP) address of the first gateway node.

20. The computer system of claim 15, wherein the storage comprises a third member cluster.

* * * * *